(12) United States Patent
Gong et al.

(10) Patent No.: US 8,385,688 B2
(45) Date of Patent: Feb. 26, 2013

(54) SYSTEM AND METHOD FOR AUTOMATIC RECOGNITION AND LABELING OF ANATOMICAL STRUCTURES AND VESSELS IN MEDICAL IMAGING SCANS

(75) Inventors: Leiguang Gong, New Brunswick, NJ (US); Jonathan B. Rohrer, Zug (CH); Giridharan R. Iyengar, Nanuet, NY (US)

(73) Assignee: International Business Machines Corporation, Armonk, NY (US)

(*) Notice: Subject to any disclaimer, the term of this patent is extended or adjusted under 35 U.S.C. 154(b) by 1160 days.

(21) Appl. No.: 12/199,073

(22) Filed: Aug. 27, 2008

(65) Prior Publication Data

US 2010/0054525 A1 Mar. 4, 2010

(51) Int. Cl.
*G06K 9/32* (2006.01)
*G06K 9/00* (2006.01)

(52) U.S. Cl. ........ 382/294; 382/128; 382/173; 382/224; 382/256

(58) Field of Classification Search .................. 382/128, 382/173, 224, 256, 294
See application file for complete search history.

(56) References Cited

U.S. PATENT DOCUMENTS

| | | | | |
|---|---|---|---|---|
| 5,239,596 A * | 8/1993 | Mahoney | ...................... | 382/180 |
| 5,699,452 A | 12/1997 | Vaidyanathan | | |
| 6,453,069 B1 * | 9/2002 | Matsugu et al. | .............. | 382/173 |
| 6,766,055 B2 | 7/2004 | Matsugu et al. | | |
| 6,909,794 B2 | 6/2005 | Caspi | | |
| 7,388,973 B2 | 6/2008 | Fidrich et al. | | |
| 2002/0164074 A1 * | 11/2002 | Matsugu et al. | .............. | 382/173 |
| 2003/0099390 A1 * | 5/2003 | Zeng et al. | ...................... | 382/131 |
| 2004/0100563 A1 * | 5/2004 | Sablak et al. | .............. | 348/211.4 |
| 2004/0106864 A1 | 6/2004 | Rose et al. | | |
| 2005/0276455 A1 * | 12/2005 | Fidrich et al. | .................. | 382/128 |
| 2006/0002631 A1 | 1/2006 | Fu et al. | | |
| 2006/0056672 A1 | 3/2006 | Barth et al. | | |
| 2006/0094961 A1 * | 5/2006 | Mikheev et al. | .............. | 600/437 |
| 2007/0003138 A1 * | 1/2007 | Hobson et al. | ................ | 382/173 |
| 2007/0116337 A1 | 5/2007 | Toth et al. | | |
| 2007/0127790 A1 | 6/2007 | Lau et al. | | |
| 2007/0237373 A1 * | 10/2007 | Kiraly et al. | .................. | 382/128 |
| 2007/0297657 A1 | 12/2007 | Mattes et al. | | |

OTHER PUBLICATIONS

Archip et al., A Knowledge-Based Approach to Automatic Detection of the Spinal Cord in CT Images; IEEE Transactions on Medical Imaging, vol. 21, No. 12; Dec. 2002; pp. 1504-1516.

Zrimec et al., 3D Modellling and Visualization of the Human Lung; Proceedings of the 2nd Int'l Symposium on 3D Data Processing; Visualization and Transmission; (3DPVT '04); 2004; 6 pages.

\* cited by examiner

*Primary Examiner* — John Strege
(74) *Attorney, Agent, or Firm* — Tutunjian & Bitetto, P.C.; Preston J. Young

(57) ABSTRACT

A system and method for recognizing and labeling anatomical structures in an image includes creating a list of objects such that one or more objects on the list appear before a target object and setting the image as a context for a first object on the list. The first object is detected and labeled by subtracting a background of the image. A local context is set for a next object on the list using the first object. The next object is detected and labeled by registration using the local context. Setting a local context and detecting and labeling the next object are repeated until the target object is detected and labeled. Labeling of the target object is refined using region growing.

16 Claims, 5 Drawing Sheets

SYSTEM AND METHOD FOR AUTOMATIC RECOGNITION AND LABELING OF ANATOMICAL STRUCTURES AND VESSELS IN MEDICAL IMAGING SCANS

BACKGROUND

1. Technical Field

The present invention relates to image processing, and more particularly to systems and methods for medical imaging with image recognition and image registration capabilities.

2. Description of the Related Art

Recognition and labeling of anatomical structures in medical images is a critical step for many important clinical applications such as treatment and drug evaluation, surgery planning, and real-time image assisted surgery. Computer-assisted atlas-based methods have been developed for various anatomical structures to overcome the limitations in efficiency and consistency of pure manual manipulation. Among these applications, automatic recognition of organs and other anatomical structures such as the spine and the blood vessels including the main artery blood vessel aorta and smaller iliac vessels, from medical images such as computed tomography (CT) abdominal images presents a unique challenge due to the difficulties in handling significant variability in patient data, such as morphological and spatial changes between different acquisitions even from a same patient.

For the recognition of anatomical structures, such as blood vessels in three dimensional (3D) computed tomography (CT) scans of the human abdomen, etc. much progress has been made over the last 15 years. However, more automatic and accurate segmentation methods and systems are still in demand to reduce the work load due to the ever-increasing volume of medical image data. Among many existing methods, region-growing is a popular choice. However, seed selection in these methods is generally done by human intervention, which compromises the degree of automation as well as efficiency of these methods and systems.

SUMMARY

A system and method for recognizing and labeling anatomical structures in an image includes creating a list of objects such that one or more objects on the list appear before a target object, and setting the image as a context for a first object on the list. The first object is detected and labeled by subtracting or filtering the background of the image. A local context is set for a next object on the list using the first object. The next object is detected and labeled by registration using the local context. Setting a local context and detecting and labeling the next object are repeated until the target object is detected and labeled. Labeling of the target object is refined using region growing.

These and other features and advantages will become apparent from the following detailed description of illustrative embodiments thereof which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
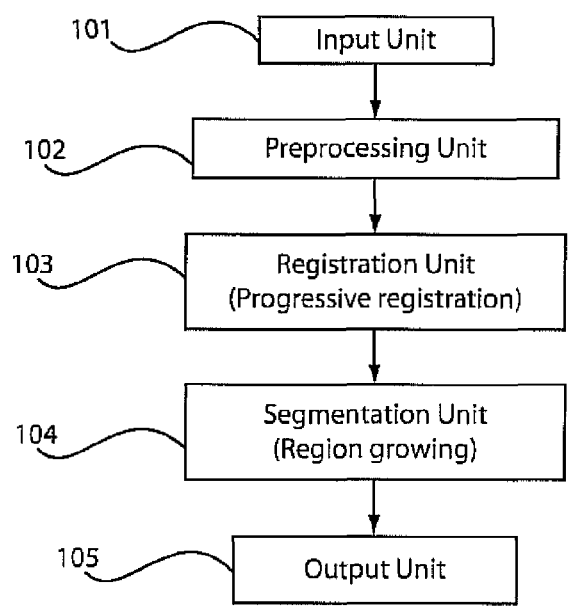
FIG. 1 is a block diagram showing a system/methods illustrating a functional structure and work flow in accordance with one embodiment.

The present principles provide a new alternative approach to the problem of automatic recognition and labeling of anatomical structures in medical images. The present embodiments treat the recognition task as a non-rigid registration problem. This uses the knowledge inferred from an atlas or model image to specify one or more anchor objects, which in turn define a sequence of reduced image spaces or spatial contexts for detecting and extracting a target object by registering progressively the atlas image with the patient image within the defined sub-image spaces.

The present embodiments include a method that uses a reference or anchor object such as the spine to define a much reduced spatial context for a focused registration of another object. This strategy is based on a proper decomposition of the anatomical regions in image space using their structural relationships such as "containment" and "neighborhood".

The present embodiments integrate image preprocessing such as background subtraction, progressive and focused atlas-based non-rigid registration and region growing for automatic recognition and labeling of anatomical structures such as the spine and main artery blood vessels (aorta and iliac) in 3D digital scans such as CT or MRI images of the human abdomen.

In one embodiment, a digital image processing method is provided where a device can be designed to execute a computer program which encodes a series of methods described herein. The program when executed may implement the recognition and labeling task in terms of a sequence of steps, which may include, e.g.: (1) loading into computer memory a first image with anatomical objects labeled as a "labeled atlas image", a second image which is the same as the first image but without labels as a "non-labeled atlas image", and a third image called a target image which is the image in which one or more anatomical structures are to be recognized and labeled; (2) storing all the images in indexable data structures in memory; (3) subtracting the background of the atlas image without labels and the target images by setting the pixels in the background to a unique pre-specified value; (4) setting an initial alignment of the non-labeled atlas image and the target images at a preselected point and angle such as the center point of the two images; (5) performing the progressive non-rigid registration with the non-labeled atlas image and the target image according to a pre-defined strategy which is a list of ordered reference or anchor objects; (6) applying a final transformation or deformation matrix produced in (5) to the labeled atlas image to produce a transformed labeled atlas image; (7) projecting the label for the target object in the transformed labeled atlas image to the target image; (8) selecting a seed or a set of seed pixels within the labeled region of the target image; (9) carrying out region growing from the seed voxel(s) to produce the final recognition and labeling of the target object; and (10) sending the labeled image to a display device for visualization or to a storage media.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program coder bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In one embodiment, the present embodiments provide a method for automated recognition and labeling of human anatomical structures such as the spines and main artery blood vessels in 3D digital scans of the human body. In another embodiment, a computer implementation of the method processes a first image called an atlas image. The atlas image includes a representative image of the human body and a set of anatomical labels corresponding to the anatomical structures scanned in the image. A second image is called a target image acquired from a human subject for the same part of the subject's body as the representative image. The problem addressed is to recognize and label one or a set of target anatomical objects in the target image with the help of the atlas image. The computer program implementing the methods can be designed for and executed on any general purpose computer systems such as a processor based desktop, laptop and server systems as well as special purpose computer systems such as graphics processing unit (GPU) systems and Cell processor based systems.

It is extremely difficult to register anatomical structures of soft tissue such as internal organs or main artery blood vessels with high accuracy, even with non-rigid registration methods. An underlying limitation with most existing methods is that they do not or rarely use the anatomical information in the image to improve the registration accuracy. The registration method presented herein uses such information in a unique way to maximize the mapping between the atlas image and the target image.

The presented registration method includes a strategy of progressively focused registration which is represented by a list of ordered anatomical structures or objects (names) contained in the image. The last in the list is the target object to be recognized and labeled in the target image. All others in the list are reference or anchor objects. The rationale underlying this strategy is that an object in an image can be better identified if the context for the object can be clearly defined with help of another more prominent and more easily identified object. Such a strategy, which may be used in vision tasks, and also in many other computer-based problem solving tasks such as landmark based navigation. Such a strategy, however, has not been employed in image registration.

The strategy can be derived from the labeled atlas image either manually, by a human designer encoding the program, or automatically by a program component based on the structural and spatial relationships between the objects in the image. The first object in the list which usually corresponds to the subject's body is first identified by background subtraction. The registration process first identifies and labels the next reference object in the list by computing the transformation field for mapping the entire non-labeled atlas to the entire target image. An optimization of the transformation parameters is performed for the entire image. Once the transformation field is obtained, it is applied to the labeled atlas image for the reference object.

The result is a labeled region in the target image that corresponds approximately to the reference object in the image. The registration process then uses the labeled region in the target image to specify a spatial context or domain, or sub-image by expanding the labeled region along its boundary by a number of pixels or voxels. The registration process next re-computes the transformation field for the sub-images and the optimization is performed (focused) within the sub-images.

The resulting transformation field is applied to the atlas image with the label of the reference object to produce a more accurate labeling of the object. The labeled region and its spatial relation to the next object in the list is used together to define a new context or sub-image for this next reference object in the list. The registration process then computes the transformation field for the sub-images and the optimization is focused and performed within the sub-images.

The resulting transformation field is applied to the image with a label of the reference object in the list. The result is a labeled region in the target image that corresponds to the reference object in the image. This process repeats again for the next reference object, if any, in the list or for the target object if the last object in the list is reached.

Referring now to the drawings in which like numerals represent the same or similar elements and initially to FIG. 1, a block/flow diagram for a system/method 100 for automatic recognition and labeling of anatomical structures. An input unit 101 reads into computer memory: 1) a first image with anatomical objects labeled as a labeled atlas image, 2) a second image which is same as the first image but without labels as non-labeled atlas image, and 3) a third image called a target image which is the image in which one or more anatomical structures are to be recognized and labeled. All three images are stored in indexable data structures in memory.

A pre-processing unit 102 normalizes the first and third images by mapping the original image intensity values to new values within a pre-specified range. The normalization can be useful when the atlas image and the target image have very different intensity value ranges such as when the modalities of the two images are different such as a CT and a magnetic resonance image (MRI). The preprocessing unit 102 provides a background subtracting process, which dynamically computes a threshold value, and then compares every pixel value against this threshold value. Pixels with intensity value lower than the threshold are assigned a same unique value such as, e.g., zero. All other pixels will keep their original values.

The preprocessing unit 102 further executes a process called region grouping. Region grouping is carried out to produce a list of independent regions of connected non-zero value pixels. The area or the total number of pixels in each region will be computed. Only the largest region will be kept as the foreground including only the body part of imaged subject. The pixels in all other regions will be assigned an intensity value of the background, which completes the process of background subtraction (See e.g., FIG. 3).

One purpose of background subtraction is to eliminate noises and irrelevant artifacts outside the subject body, since they may have a negative impact on the recognition and labeling process. Another objective for the background subtraction is to identify the body region, which will be used as the context for detecting and labeling other anatomical objects included in the body part.

A registration unit 103 provides, e.g., a progressively focused non-rigid registration process. The result of the registration process is used to automatically select a seed pixel or a set of seed pixels to carry out region growing to produce a final recognition and labeling of the target object. A segmentation unit 104 is employed to region grow the selected seed pixel or set of seed pixels identified from the result of the registration process of registration unit 103. A final recognition and labeling of the target object is sent to an output unit 105, which may includes a display device for visualization or a storage media device for storage.

Figure 2:
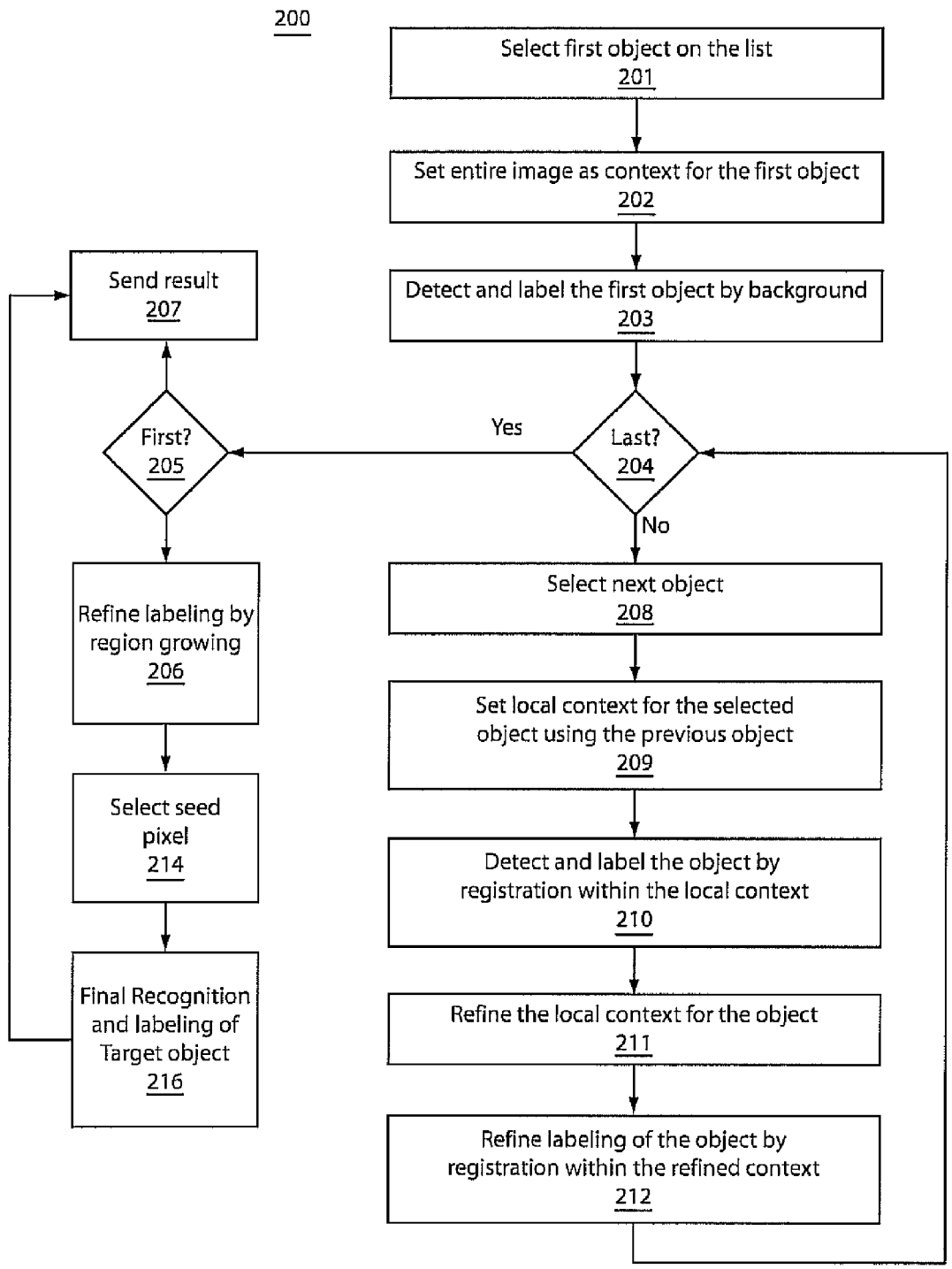
FIG. 2 is a block/flow diagram showing a system/method for recognizing and labeling a target object in an image scan in accordance with the present principles.

Referring to FIG. 2, a more detailed block/flow diagram for an entire recognition and labeling process 200 is illustratively shown focusing on progressively focused registration. In block 201, a first object is selected from a strategy plan list, for example, a body. In block 202, the entire image space is set as the context for detecting the first object. In block 203, detection and labeling of the object is performed by a background subtraction method as described below. In block 204, a determination is made as to whether the current object is also the last object in the strategy plan list. If the object is the last object, the object is the target object. Then, in block 205, a determination is made as to whether the object is the only one on the list by determining if the object is the first object on the list. If the object is both the first and the last on the list, it is the only object in the list (meaning that it is the object of the entire imaged entity, such as, the human body). In this case, the object is extracted by the preprocessing or background subtraction and the final result is achieved in block 207. If the object is the last object and not the first object, the result will be subject to further processing i.e., region growing indicated by block 206.

If the object is not the last one in the list, in block 208, the next object is selected, for example, the spine may be selected next in the strategy list. In block 209, a local context for detecting the next object is set by using the previously labeled object. How this context is defined depends on the specific structural and spatial relationship the current object has with the last recognized and labeled object. For example, to define the local context for the spine using the last detected and labeled objects in the body, the relationship of "the spine is contained in the body" determines that the region of the body is the local context for the spine. In this case, a region of the body will be used to mask an area in the target image as the context for detecting and labeling the spine.

In block 210, a non-rigid registration is employed to detect and label the object such as, e.g., the spine within the local context of the body. The result of this registration will produce an approximate mapping for the current object. The method then uses the approximate mapping to define a more close and tight context by expanding the labeled region by a small margin of n pixels, where n is an integer. The newly expanded region will be used as the mask for defining the new context for the object in block 211. The registration will be carried out again within this newly refined context in block 212 to further improve the accuracy of the detection and labeling of the object.

If the object is not the final object in the strategy list (204), then the next object in the list will be selected in block 208, and the process repeats until the detection and labeling by registration is done for the last object, e.g., the target object is completed.

The result of progressively focused registration improves the mapping accuracy significantly but does not guarantee completely correct labeling of the target object. Further processing such as segmentation may be needed to complete the task of successful recognition and labeling of the target object. A method of region growing in block 206 is employed to accomplish the task of further segmentation. Region-growing techniques have been widely used in image processing and analysis and include a process of recursively packing connected pixels according to some criteria. The packing process usually starts from one (or more) pixel called a seed pixel and checks all pixels in its immediate neighborhood. Those pixels that satisfy some criteria, for example, their intensity value is larger than a pre-defined threshold, are collected or grouped together. The process then continues recursively from each collected pixel until no more pixels can be collected.

A major limitation with most existing region growing methods is the need for human interaction to manually select the seed pixel. The present principles include a new method for automatically selecting the seed pixel. In block 214, a seed pixel is selected within a mask which is defined within the labeled region in the target object or image at a point usually at the center of the region. The mask may be, e.g., a 3 pixel by 3 pixel mask, although other sized masks may be employed. The seed pixel is determined according to certain criteria such as a pixel with the median intensity value within the mask. The region growing starts from the seed voxel to produce a final recognition and labeling of the target object in block 216. The final result becomes the target image with the target anatomical structure or object labeled. The result is sent by the output unit to a display device for visualization or to a storage media in block 207.

Figure 3:
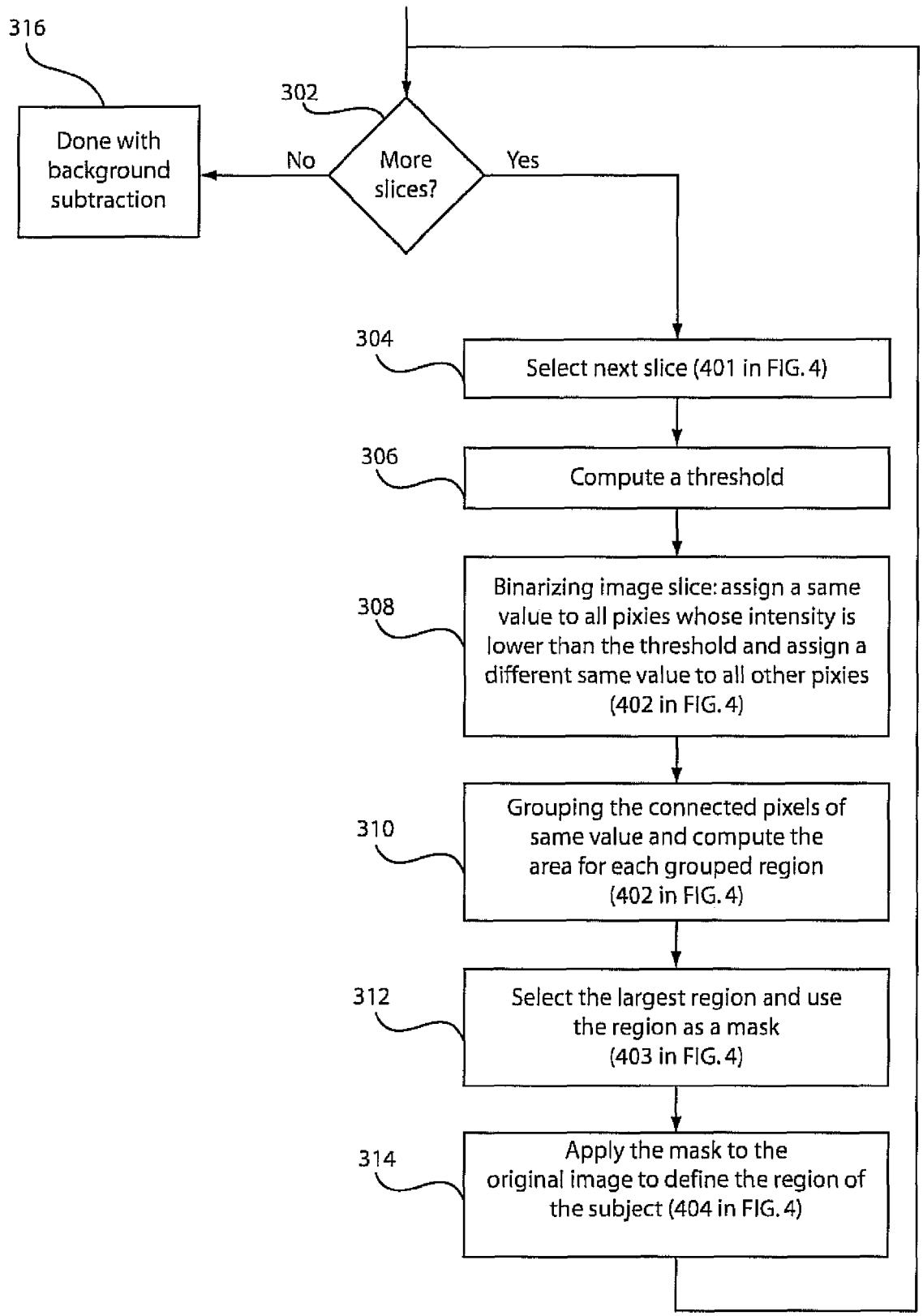
FIG. 3 is a block/flow diagram showing a system/method for background subtraction in accordance with the present principles.
Figure 4:
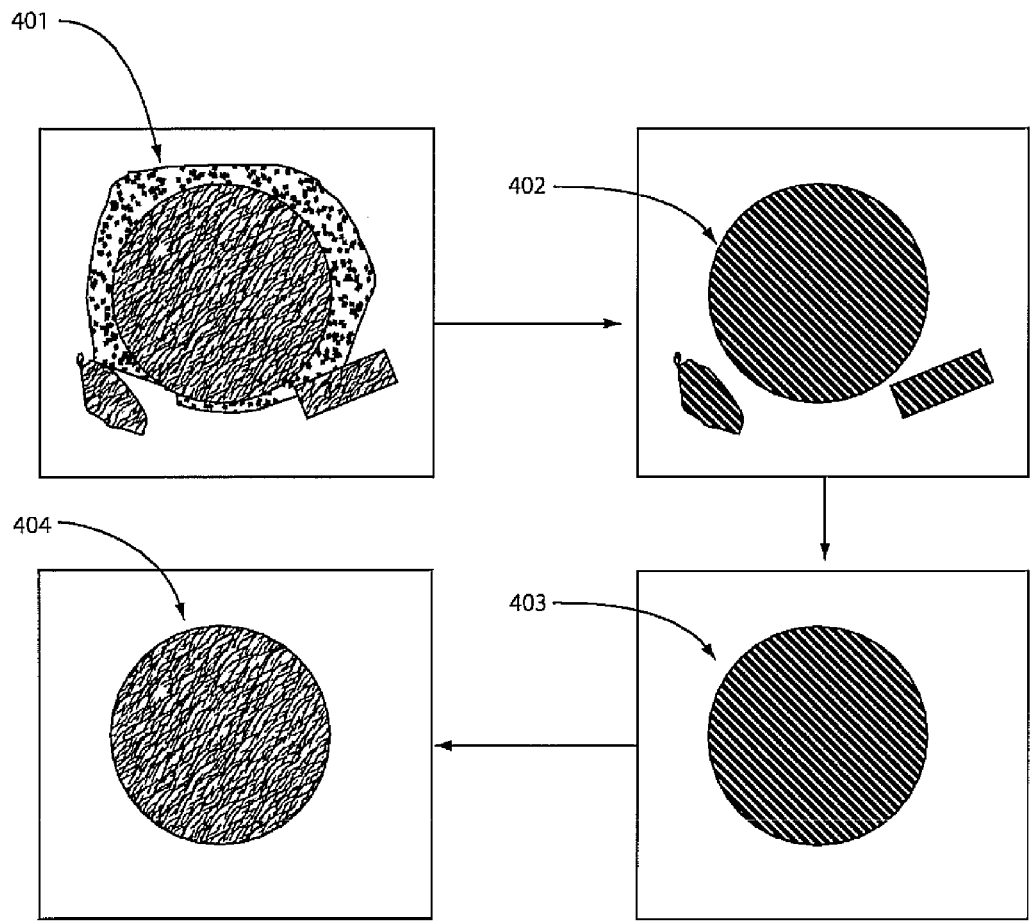
FIG. 4 is a block/flow diagram showing a system/method for background subtraction in accordance with the present principles.

Referring to FIGS. 3 and 4, background subtraction is described in greater detail. An 3D image includes a sequence of 2D images or slices. For each slice of the image, a background subtraction may be performed. If more slices are present in block 302, a next slice is selected in block 304. In FIG. 4, an illustrative slice 401 is depicted. In block 306, a threshold is computed for pixel values in the slice (401). This may include selecting a prespecified threshold or one computed based upon the pixel intensity values in the slice (e.g., a mean pixel intensity value). In block 308, the image slice is binarized to create a binarized image slice 402 (FIG. 4). The binarization may include assigning a same value to all pixels whose intensity is lower than the threshold and assign a different same value to all other pixels.

In block 310, the pixels having the same values are grouped and an area is computed for each grouped region. In block 312, a largest region is selected and used as a mask 403 (FIG. 4). In block 314, the mask 403 is applied to the original image 401 to define the region of a subject image 404 (FIG. 4). The program returns to block 302 to check for more slices. If no more slices exist, the background subtraction is complete for the entire image volume in block 316.

Figure 5:
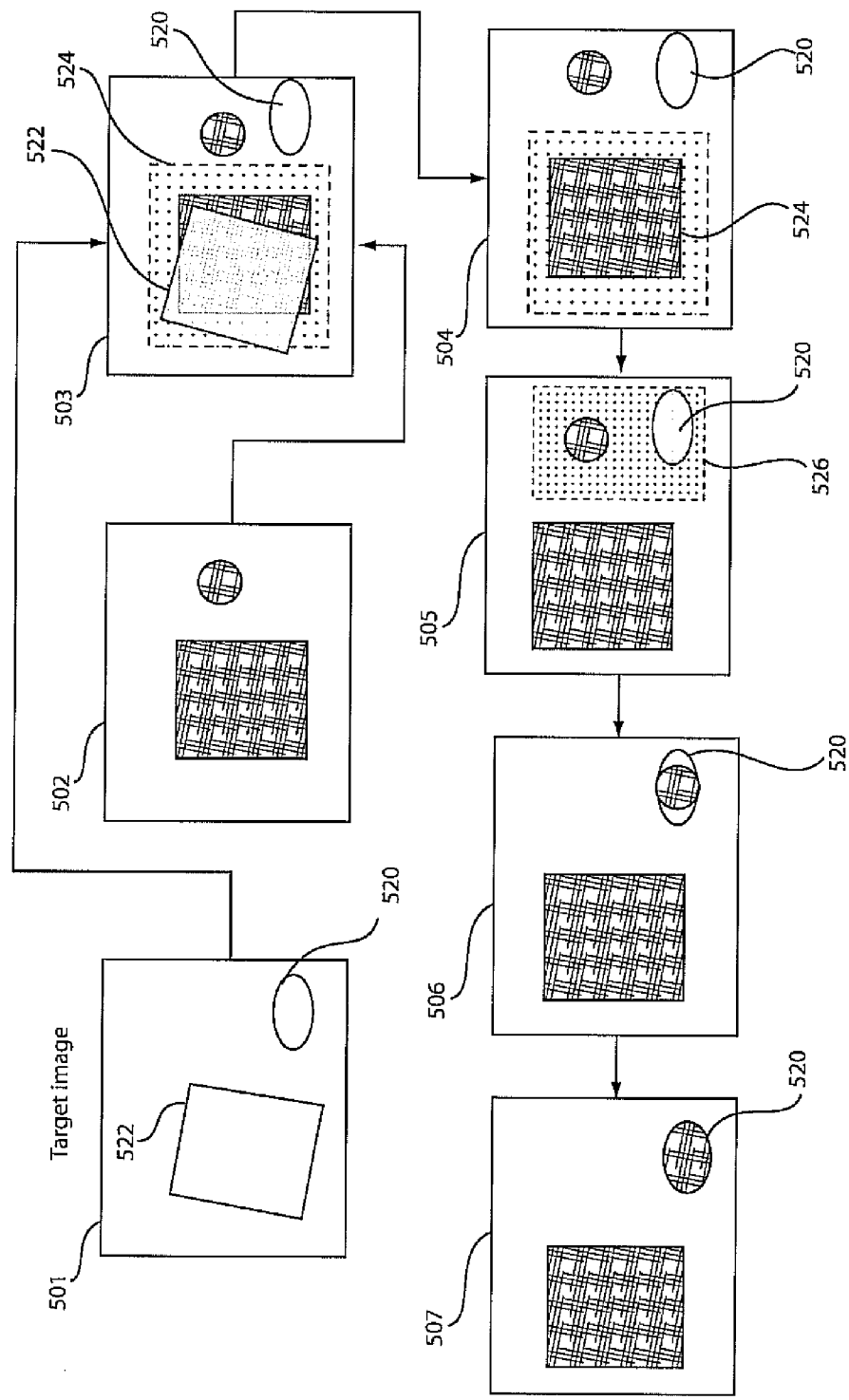
FIG. 5 is a block/flow diagram showing a system/method for a progressively focused registration process in accordance with the present principles.

Referring to FIG. 5, a progressively focused registration process using simplified manually composed images is illustratively depicted. A target image 501 is provided from which a target object 520 is to be recognized and labeled. Atlas images 502 (both with and without labels) are provided to be used for computing a transformation with the target image 501. An initial (global) registration of the target image and the atlas images produces an approximate alignment and labeling in block 503 of a reference or anchor object 522 selected from a strategy plan. This is achieved by mapping the labeled atlas image 502 using the transformation computed with both the target image 520 and non-labeled atlas image (502). A local context 524 is then defined for the reference object 522.

A focused registration is performed with the context to further improve the recognition of the reference object. Block 504 shows a much better match of the reference object 524 (covered by the corresponding atlas image). Based on the spatial relationship of this recognized anchor object 524 and the target object 520, a local context 526 is defined for the target object 520 and registration is carried out within the context in block 505.

A registration result 506 is used to automatically specify a seed pixel from which the region-growing process starts and achieves a final recognition and labeling of the target object in block 507.

Having described preferred embodiments of a system and method for automatic recognition and labeling of anatomical structures and vessels in medical imaging scans (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for recognizing and labeling anatomical structures in an image, comprising:
   creating a list of objects such that one or more objects on the list appear before a target object;
   setting an entire image as a context for a first object on the list;
   detecting and labeling the first object by subtracting a background from the image;
   setting a local context for a next object on the list using the first object;
   detecting and labeling the next object by registration using the local context;
   repeating the steps of setting a local context and detecting and labeling the next object until the target object is detected and labeled; and
   refining labeling of the target object using region growing.

2. The method as recited in claim 1, wherein detecting and labeling the next object by registration using the local context includes detecting and labeling the next object using a non-rigid registration process.

3. The method as recited in claim 1, wherein the non-rigid registration process provides an approximate mapping for a current object.

4. The method as recited in claim 3, further comprising refining the local context of an object by employing the approximate mapping to define a refined context by expanding a labeled region for the current object by a margin of pixels.

5. The method as recited in claim 4, further comprising reregistering the current object in the refined context.

6. The method as recited in claim 1, further comprising redefining labeling on the target object using a region growing method.

7. The method as recited in claim 6, wherein the region growing method further comprises automatically selecting a seed pixel in the target object; and growing the region from the seed pixel.

8. The method as recited in claim 7, wherein the seed pixel includes a mask and the region growing results in a more accurate detection and labeling of the target object.

9. A computer readable storage medium comprising a computer readable program for recognizing and labeling anatomical structures in an image, wherein the computer readable program when executed on a computer causes the computer to perform the steps of:
   creating a list of objects such that one or more objects on the list appear before a target object;
   setting an entire image as a context for a first object on the list;
   detecting and labeling the first object by subtracting a background from the image;
   setting a local context for a next object on the list using the first object;
   detecting and labeling the next object by registration using the local context;
   repeating the steps of setting a local context and detecting and labeling the next object until the target object is detected and labeled; and
   refining labeling of the target object using region growing.

10. The computer readable storage medium as recited in claim 9, wherein detecting and labeling the next object by registration using the local context includes detecting and labeling the next object using a non-rigid registration process.

11. The computer readable storage medium as recited in claim 9, wherein the non-rigid registration process provides an approximate mapping for a current object.

12. The computer readable storage medium as recited in claim 11, further comprising refining the local context of an object by employing the approximate mapping to define a refined context by expanding a labeled region for the current object by a margin of pixels.

13. The computer readable storage medium as recited in claim 12, further comprising reregistering the current object in the refined context.

14. The computer readable storage medium as recited in claim 9, further comprising redefining labeling on the target object using a region growing method.

15. The computer readable storage medium as recited in claim 14, wherein the region growing method further comprises automatically selecting a seed pixel within a region labeled by a registration process for the target object; and growing the region from the seed pixel.

16. The computer readable storage medium as recited in claim 15, wherein the seed pixel selection includes a mask and the region growing results in a more accurate detection and labeling of the target object.

* * * * *